May 15, 1928.

R. P. HIGBEE

ELEVATOR CONTROL SYSTEM

Filed May 24, 1923

WITNESSES:
R. J. Butler.
H. Keith

INVENTOR
Ray P. Higbee.
BY
Wesley G. Carr
ATTORNEY

Patented May 15, 1928.

1,669,518

UNITED STATES PATENT OFFICE.

RAY P. HIGBEE, OF WILKINSBURG, PENNSYLVANIA, ASSIGNOR TO WESTINGHOUSE ELECTRIC & MANUFACTURING COMPANY, A CORPORATION OF PENNSYLVANIA.

ELEVATOR CONTROL SYSTEM.

Application filed May 24, 1923. Serial No. 641,070.

My invention relates to systems of motor control and it has particular relation to such systems as are employed in connection with elevators, hoists and similar machines.

An object of my invention is to provide a system of control that is particularly adapted for plural-speed alternating-current motors.

Another object of my invention is to provide a novel system of acceleration for alternating-current motors.

In conjunction with the main motor employed in my invention, I provide an auxiliary generator, preferably of the alternating-current type, suitable for operating a plurality of electromagnetic switches. This generator is also arranged to supply current at a voltage proportional to the speed of the main motor. The corresponding variation in voltage is utilized for controlling the motor in a manner to be hereinafter described.

Figure 1:
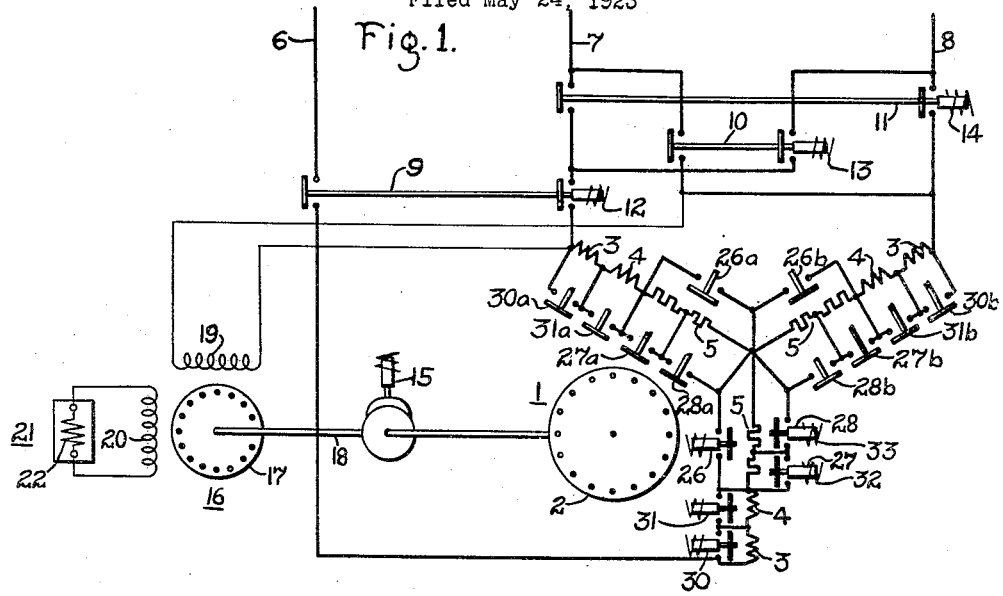

My invention will be best understood by reference to the accompanying drawing, in which Figure 1 is a diagrammatic view of the main circuits and apparatus embodying my invention.

Figure 2:
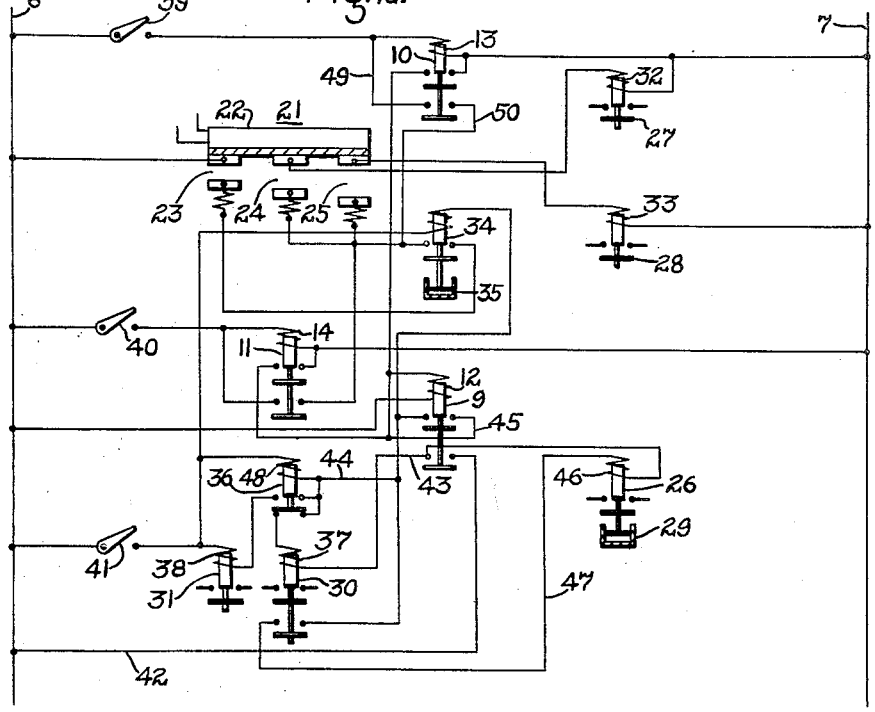

Fig. 2 is a diagrammatic representation of control circuits employed in the system of Fig. 1.

Referring to Fig. 1, a motor 1 is provided with a rotor 2 preferably of the squirrel-cage type and with high and low speed primary windings 3 and 4, respectively. These windings, as illustrated, are Y-connected by means of a plurality of resistors 5, and may be energized from line conductors 6, 7 and 8 through a double-pole line switch 9 and reversing switches 10 and 11. These switches are respectively controlled by means of cooperating coils 12, 13 and 14. An electromagnetic brake 15 is adapted to be employed in a familiar manner, when the motor 1 is connected for driving hoisting apparatus.

An auxiliary induction generator 16 is provided with a rotor 17 that is mechanically connected by a shaft 18, or other suitable means, to the rotor 2 of motor 1. A primary phase winding 19 for generator 16 is energized from line conductors 7 and 8 and a second phase winding 20, which is shown as in quadrature relation to phase winding 19, supplies energy to an accelerating relay 21.

As illustrated in Fig. 2, relay 21 is of a "multiple-finger" type having an operating magnet 22 for successively actuating a plurality of switches 23, 24 and 25. These switches are disposed in staggered relation and operate successively in accordance with an increased voltage impressed upon the magnet 22. In place of a multiple-finger relay of this familiar type, a suitable number of individual relays may be employed. A primary resistor switch 26 operates an additional pair of contact members 26a and 26b. Similarly, switches 27 and 28 respectively actuate pairs of auxiliary contact members 27a and 27b and 28a and 28b. The closing movement of switch 26 is controlled by a dash-pot 29. (See Fig. 2.)

The motor windings 3 and 4 are controlled as hereinafter described, by means of three-pole switches provided with bridging contact members 30, 30a and 30b, and 31, 31a and 31b, respectively. Switches 24 and 25 of accelerating relay 21 control operating coils 32 and 33 that are respectively provided for switches 27 and 28, and switch 23 of relay 21 controls reversing switches 10 and 11, as hereinafter set forth. A relay 34 also controls the operation of reversing switches 10 and 11. This relay is provided with a double-acting dash-pot 35, which retards the relay in its opening and closing movements. A transfer-relay 36, in its lower position, completes a circuit for the operating coil 37 of switch 30 and, in its upper closed position, completes a circuit for the operating coil 38 of switch 31.

Master switch contact members 39 and 40 respectively control the direction of operation of the motor 1 and master switch contact member 41 controls the high speed operation of the motor.

Assuming the switches and apparatus in the illustrated inoperative condition, the motor 1 is started in a forward direction upon the closure of master switch contact member 39. Reversing switch 10 first closes to effect the closure of line switch 9, a circuit for the operating coil 12 of which extends through reversing switch 10. Upon the closure of line switch 9, a circuit is established for the operating coil 37 of switch 30 extending from line conductor 6 through conductor 42, switch 9, conductor 43, operating coil 37, transfer relay 36 in its lower closed position, conductor 44, upper contact members of switch 9, conductor 45, and switch 10 to line conductor 7.

Energy is now supplied to the motor 1 from conductors 6, 7 and 8 through primary phase windings 4 and resistors 5, primary phase windings 3 being shunted by switches 30, 30a and 30b, respectively. A circuit is also established for the operating coil 46 of relay 26 extending from line conductor 6 through conductor 42, lower contact members of switch 9, coil 46, conductor 47, lower contact members of switch 30, upper contact members of switch 9, conductor 45 and switch 10 to line conductor 7. The closure of switches 26, 26a and 26b, shunts the entire resistors 5, whereby the speed of motor 1 is accelerated to a value corresponding to the excitation of the low-speed primary windings 4.

Upon the closure of master switch contact member 41, a circuit is established for the operating coil 48 of transfer relay 36 extending from line conductor 6 through switch 41, coil 48, conductor 44, upper contact members of switch 9, conductor 45, and switch 10 to line conductor 7. Relay 36 then completes a circuit through its upper contact members for the operating coil 38 of switch 31 and interrupts a circuit through the operating coil 37 of switch 30. The opening of switch 30 effects the opening of switch 26, a circuit for the operating coil 46 having been previously traced. Primary windings 3 and 4 and resistors 5 are momentarily included in circuit during the transition period prior to the closure of switch 31. However, upon the closure of switch 31 the low-speed primary windings 4 are shunted and the motor 1 is further accelerated in a familiar manner. Relay 34, having an operating coil in parallel relation to coil 48 of relay 36, closes a circuit to switch 23, for a purpose hereinafter set forth.

The operation of generator 16, the speed of which corresponds to the speed of the motor 1, is evidently such as to gradually increase the excitation of phase winding 20, whereupon the excitation of magnet 22 of accelerating relay 21 is gradually increased to effect the successive closure of switches 23, 24 and 25. The purpose of switch 23 will appear later. Switch 24 establishes a circuit for the operating coil 32 of switches 27, 27a, and 27b, extending from line conductor 6, through switch 39, conductor 49, switch 10, conductor 50, switch 24, and coil 32 to line conductor 7. The closure of switches 27, 27a and 27b shunts a portion of resistors 5. After motor 1 has further accelerated and the excitation of the accelerating magnet 22 has further increased, switch 25 closes to complete a circuit through operating coil 33 and effect the closure of switches 28, 28a and 28b, thereby shunting the remaining portions of the resistors 5 and impressing full line voltage upon the motor 1.

Deceleration of the motor 1 may be effected by employing a reverse order of master switch operation; that is, the initial opening of master switch contact member 41, and the subsequent opening of contact member 39. However, my invention is more particularly concerned with securing dynamic braking effect upon the motor 1 when master switch contact members 41 and 39 are opened substantially simultaneously, when the motor is operating at high speed. Under this condition of operation, transfer relay 36 becomes de-energized to effect the opening of switches 31, 31a and 31b and the re-closure of switches 30, 30a and 30b. Thus, the low-speed windings 4 are again energized to reduce the speed of motor 1, in a familiar manner, to a value corresponding to the excitation of the windings 4.

It should be observed that the opening of switch 39 does not immediately effect the opening of reversing switch 10 on account of the fact that a holding circuit extends from line conductor 6 through switch 23, relay 34, conductor 50, lower contact members of switch 10 and operating coil 13 to line conductor 7. Switch 23 remains closed until the voltage supplied by generator 16 is reduced to a value corresponding to the speed reduction of motor 1. Switch 23 may readily be adjusted to open at the proper time, but I prefer to provide additional means, such as relay 34, which becomes effective, in emergency, that is, upon the failure of switch 23 to open, whereby the opening of switch 10 is ensured, after a predetermined period of time, that is determined by the dash-pot 35.

In stopping the motor 1, the operating coil of relay 34 is de-energized upon the opening of master switch contact member 41, but the opening of said relay is delayed by the dash-pot 35. The utility of relay 34 becomes apparent in the event of an emergency, when the failure of switch 23 to open, for any reason, would otherwise prevent the opening of reversing switch 10. In this case, the motor would continue to operate until stopped by means of one of the limit-switches (not shown) customarily provided for motor-driven apparatus. It is believed preferable to employ additional means, such as is provided by the present invention, to ensure the proper operation of the reversing switches within a predetermined period that is, in a measure, under the control of the operator.

Operation of the motor 1 in a reverse direction is effected in a manner similar to that above described upon the closure of master switch contact member 40, whereby reversing switch 11 is closed. The various relays and control switches function as previously described, for effecting both acceleration and deceleration, as will be readily appreciated.

According to my invention, a plural-speed alternating current motor is controlled particularly during deceleration, in a manner approaching the flexibility attained with adjustable speed direct-current motors. It is especially desirable, as previously indicated, that the motor should be reduced in speed, automatically, prior to disconnection from the source of energy. One reason for this method of control is to ensure greater accuracy in stopping the motor, and another reason is to avoid the necessity for imposing the entire braking load upon the electromechanical brake. The auxiliary generator 16 is preferably of a simple design having two stator phase windings and a squirrel cage rotor. With a generator of this type, auxiliary reversing switch mechanism and other undesirable features of combined alternating-current and direct-current braking systems, are avoided.

When desired, it is possible to operate the accelerating or resistor shunting switches directly from the generator 16, but I have found that a multiple-finger relay lends itself more readily to a number of motor applications, and is easily adjusted to varying service requirements.

I claim as my invention:

1. The combination with an alternating-current motor having separate high-speed and low-speed operating windings, and means for selectively establishing power connections for said windings, of electroresponsive means for insuring the establishment of low-speed connections for a desired period, prior to stopping the motor, after operation of said motor at high speed.

2. The combination with an alternating-current motor having separate high-speed and low-speed operating windings, of means for selectively establishing power connections for said windings, and electroresponsive means for accelerating the motor and for insuring the establishment of low-speed connections for a desired period, prior to stopping the motor, after operation of said motor at high speed, said electroresponsive means acting automatically to disconnect said motor subsequent to said low-speed operation.

3. The combination with an alternating-current motor having separate high-speed and low-speed operating windings, of means for selectively establishing power connections for said windings, and electroresponsive means for insuring the establishment of low-speed connections for a desired period prior to stopping the motor, after operation of said motor at high speed, said electroresponsive means acting automatically under certain speed conditions to disconnect said motor subsequent to said low-speed operation.

4. The combination with an alternating-current motor having separate high-speed and low-speed operating windings, of means for establishing power connections for said high-speed windings, and electroresponsive means for insuring the establishment of low-speed connections for a desired period prior to stopping the motor, after operation of said motor at high speed.

5. The combination with an alternating-current motor having separate high-speed and low-speed operating windings, of means for selectively establishing power connections for said windings, and electroresponsive means comprising a variable voltage alternating current generator operated by said motor for acceleration and for insuring the establishment of low-speed connections for a desired period, prior to stopping said motor, after operation of said motor at high speed.

6. The combination with an alternating-current motor having high-speed and low-speed operating windings, and manual controlling means therefor, of means for effecting acceleration of the motor, an electroresponsive device for controlling the accelerating means, and means comprising said device for rendering one of said speed windings effective independently of said manual means.

7. The combination with an alternating-current motor having high-speed and low-speed operating windings, and manual controlling means therefor, of means for effecting acceleration of the motor, an electroresponsive device comprising a generator having two phase-windings and a rotor operatively connected to said motor for controlling the accelerating means, and means comprising said device for rendering one of said speed windings effective independently of said manual means.

8. The combination with an alternating-current motor and accelerating means therefor, of an alternating current generator for controlling said accelerating means having an exciting phase-winding therefor and a second phase-winding energized from said exciting winding in accordance with the speed of said motor.

9. The combination with an alternating-current motor having high-speed and low-speed operating windings and manual controlling means for selectively rendering said windings effective, of electroresponsive means comprising a variable voltage generator for rendering one of said windings effective when said manual means is inoperative, and means for controlling the effect of said generator.

10. The combination with an alternating-current motor having separate high-speed and low-speed operating windings, of means for selectively establishing power connections for said windings, electroresponsive means comprising a variable voltage induction generator operated by said motor for insuring the establishment of low-speed connections for a desired period, prior to stopping the motor, after operation of said motor at high speed, and means operative under predetermined conditions for rendering said generator ineffective.

11. The combination with an alternating-current motor having separate high-speed and low-speed operating windings, and means for selectively establishing power connections for said windings, of electroresponsive means for insuring the establishment of low-speed connections for a desired period, prior to stopping the motor, after operation of said motor at high speed, and means for insuring disconnection of said motor after a predetermined time upon failure of said electroresponsive means.

In testimony whereof, I have hereunto subscribed my name this 14th day of May, 1923.

RAY P. HIGBEE.